US009182528B2

(12) United States Patent
Colodrero Pérez et al.

(10) Patent No.: US 9,182,528 B2
(45) Date of Patent: Nov. 10, 2015

(54) MULTILAYER STRUCTURE FORMED BY NANOPARTICULAR LAMINA WITH UNIDIMENSIONAL PHOTONIC CRYSTAL PROPERTIES, METHOD FOR THE PRODUCTION THEREOF AND USE THEREOF

(75) Inventors: Silvia Colodrero Pérez, Seville (ES); Manuel Ocaña Jurado, Tomares (ES); Hernán Ruy Miguez Garcia, Seville (ES)

(73) Assignee: CONSEJO SUPERIOR DE INVESTIGACIONES CIENTIFICAS, Madrid (ES)

( * ) Notice: Subject to any disclaimer, the term of this patent is extended or adjusted under 35 U.S.C. 154(b) by 1411 days.

(21) Appl. No.: 12/528,438

(22) PCT Filed: Feb. 20, 2008

(86) PCT No.: PCT/ES2008/070028
§ 371 (c)(1),
(2), (4) Date: Feb. 18, 2010

(87) PCT Pub. No.: WO2008/102046
PCT Pub. Date: Aug. 28, 2008

(65) Prior Publication Data
US 2010/0178480 A1 Jul. 15, 2010

(30) Foreign Application Priority Data
Feb. 23, 2007 (ES) .................................. 200700481

(51) Int. Cl.
*B32B 7/02* (2006.01)
*B05D 5/06* (2006.01)
(Continued)

(52) U.S. Cl.
CPC ................. *G02B 5/285* (2013.01); *B82Y 20/00* (2013.01); *G02B 1/005* (2013.01); *G02B 5/286* (2013.01);
(Continued)

(58) Field of Classification Search
CPC .......... B32B 27/36; B32B 27/08; B32B 7/02; B32B 27/32; B32B 15/08; B32B 27/00; G11B 5/716
USPC .................... 428/212, 213; 427/162; 977/773
See application file for complete search history.

(56) References Cited

U.S. PATENT DOCUMENTS

2004/0219348 A1* 11/2004 Jacquiod et al. ........... 428/304.4
2005/0145964 A1 7/2005 Suzuki et al.

FOREIGN PATENT DOCUMENTS

EP 2 073 045 6/2009
ES 2 296 533 1/2009
(Continued)

OTHER PUBLICATIONS

Fuertes, M.C.; Photonic Crystals from Ordered Mesoporous Thin-Film Functional Building Blocks; May 21, 2007; Advanced Functional Materials; vol. 17, pp. 1247-1254; whole document.*
(Continued)

*Primary Examiner* — Tahseen N Khan
(74) *Attorney, Agent, or Firm* — K&L Gates LLP

(57) ABSTRACT

The subject of the present disclosure is a multilayer nanoparticular, mesoporous structure that has properties of a Bragg reflector or of a unidimensional photonic crystal in the ultraviolet, visible and infrared ranges close to the electromagnetic spectrum. The unidimensional photonic crystal is formed by laminae with different indices of refraction and of a controlled size, made up of nanoparticles, which can be deposited on different types of substrates using a simple and reliable method. The periodic alternating of laminae with different indices of refraction gives rise to a high reflection factor which can easily be observed with the naked eye and can be measured with a spectrophotometer. In contrast to other, dense, reflective structures, the mesoporous structure of this reflector allows the passage of liquids.

24 Claims, 7 Drawing Sheets

(51) Int. Cl.
- *G02B 5/28* (2006.01)
- *B82Y 20/00* (2011.01)
- *G02B 1/00* (2006.01)
- *G02B 5/08* (2006.01)

(52) U.S. Cl.
CPC ......... *G02B 5/0816* (2013.01); *G02B 2207/107* (2013.01); *Y10T 428/2495* (2015.01); *Y10T 428/24942* (2015.01)

(56) References Cited

FOREIGN PATENT DOCUMENTS

| JP | 2005-338243 | | 12/2005 |
|---|---|---|---|
| JP | 2006-343375 | | 12/2006 |
| JP | 2006343375 | A * | 12/2006 |
| JP | 2007-033593 | | 2/2007 |

OTHER PUBLICATIONS

Machine English Translation of JP_2006343375_A; Sasaki, Yuuri; Refractive Index Control Method of Photonic Crystal; Dec. 21, 2006; JPO; whole document.*

Lin, et al., "A Porous Silicon-Based Optical Interferometric Biosensor", Science, vol. 278, 1997, pp. 840-843.

Torres-Costa, et al., "Porous silicon optical devices for sensing applications", Optical Materials, vol. 27, 2005, pp. 1084-1087.

Thomas, "Single layer TiO2 and multilayer TiO2—SiO2 optical coatings prepared from colloidal suspensions", Applied Optics, vol. 26, No. 21, 1987, pp. 4688-4691.

Gao, et al., "Tuning the Response and Stability of Thin Film Mesoporous Silicon Vapor Sensors by Surface Modification", Langmuir, vol. 18 (25), 2002, pp. 9953-9957.

Snow, et al., "Vapor sensing using the optical properties of porous silicon Bragg mirrors", Journal of Applied Physics, vol. 86, 1999, pp. 1781-1784.

Choi, et al., "Mesoporous Bragg Stack Color Tunable Sensors", Nano Letters, 2006, 6, 2456, p. Est: 5.2, A-F.

Almeida et al., "Photonic bandgap materials and structures by sol-gel processing", Journal of Non-Crystalline Solids 326&327, 2003, pp. 405-409.

Rabaste et al., "Sol-gel manufacturing of thick multilayers applied to Bragg reflectors and microcavities", Thin Solid Films, 416, 2002, pp. 242-247.

Almeida et al., "Photonic band gap structures by sol-gel processing", Current Opinion in Solid State and Materials Science 7, 2003, pp. 151-157.

Arroyo-Hernandez et al., "Biofunctionalization of surfaces of nanostructed porous silicon", Materials Science and Engineering C 23, 2003, pp. 697-701.

Kordas et al., "Optical properties of porous silicon. Part I: Fabrication and investigation of single layers", Optical Materials, 25, 2004, pp. 251-255.

Kordas et al., "Optical properties of porous silicon. Part II: Fabrication and investigation of multilayer structures", Optical Materials, 25, 2004, pp. 257-260.

Zhang et al., "ZrO2 thin films and ZrO2 / SiO2 optical reflection filters deposited by sol-gel method", Materials Letters, 45, 2000, pp. 311-314.

Brinker et al., "Sol-Gel Science: The Physics and Chemistry of Sol-Gel Processing", Academic New York, 1990.

Chen et al., "SiO2/TiO2, omnidirectional reflector and microcavity resonator via the sol-gel method", Applied Physics Letters, vol. 75, No. 24, 1999, pp. 3805-3807.

Biswas, et al. "Preparation of wavelength-selective reflectors by sol-gel processing", Journal of Materials Science Letters, vol. 6, 1987, pp. 1481-1482.

* cited by examiner

MULTILAYER STRUCTURE FORMED BY NANOPARTICULAR LAMINA WITH UNIDIMENSIONAL PHOTONIC CRYSTAL PROPERTIES, METHOD FOR THE PRODUCTION THEREOF AND USE THEREOF

CROSS REFERENCE TO RELATED APPLICATIONS AND PRIORITY CLAIM

This application claims the benefit under 35 U.S.C. §371 to PCT/ES2008/070028 filed Feb. 20, 2008, which claims the benefit of Spanish Patent Application No. P200700481 filed Feb. 23, 2007 in Spain. The entire disclosures of said applications are incorporated herein by reference thereto.

BACKGROUND

Materials with a multilayer structure have important applications as optical elements, as they act as interferential filters or Bragg reflectors, capable of selectively reflecting or transmitting a range of electromagnetic frequencies, generally comprised between the ultraviolet and infrared ranges of the spectrum, determined by the thickness and refractive index of the layers. Using more recent terminology, these materials are unidimensional photonic crystals, as they have a periodic modulation of the refractive index in one of the three spatial directions.

The multilayer systems currently available on the market are mostly manufactured using techniques that are normally grouped under the term Physical Vapor Deposition. In all cases, deposition takes place under vacuum conditions, and the solid is condensed directly from the vapor phase. Optical coatings obtained through this kind of technique have great stability against variations in ambient conditions, in addition to high mechanical resistance. There is another large group of multilayer formation methods based on sol-gel type processes. These methods have allowed the development of multilayer coatings, which are highly resistant to damage caused by intense laser radiation, having much higher damage thresholds than other types of structures. However, these multilayer coatings have low mechanical stability, and their properties vary according to the ambient conditions, both phenomena being related to their mesoporosity, due to which they are not suitable as passive optical elements, even though they do have applications in other fields, such as that of sensors. Typically, the pores of a layer grown by sol-gel are irregular in shape, with a very wide size distribution and an average size comprised between 2 nm and 100 nm. A multilayer structure with a controlled mesostructure (shape and size), the optical properties of which can be controlled, would open new application possibilities for these types of materials in different fields. Materials with relatively controlled mesoporosity and which have aroused much interest, although uses for these have not yet been presented, have also been recently developed. They are porous silicon multilayer structures obtained by means of electrochemical dissolution. Very recently, multilayer structures have been developed wherein each layer has an ordered mesoporosity of a finely controlled size, the materials used being silica and titania. This work is the object of a Spanish patent filed in 2006 (application number: 200602405). Finally, there is a reference to the disclosure presented herein in scientific literature that bears close relationship thereto. It relates to the manufacturing of colloidal silica and titania particle multilayers as a reflective or anti-reflective coating carried out by I. M. Thomas in 1987. Although the method described is similar to that presented herein, there is hardly any characterization of the material obtained, due to which it is difficult to know the type of structure that was achieved at the time.

The disclosure presented herein is closely related to these four groups of materials, which are described in further detail below.

Multilayer Materials Obtained by Sol-Gel, Alternating Dense $TiO_2$ and $SiO_2$ Layers The manufacturing techniques commonly used to synthesize micro-components in solid state are suitable for small areas, of the size of a wafer. If we need to deposit thin laminae on areas of greater size, sol-gel techniques [C. J. Brinker and G. W. Scherer, *Sol-Gel Science: The Physics and Chemistry of Sol-Gel Processing*, Academic New York, 1990] offer significant advantages: it is a simple method that allows a wide variety of materials (oxides, semiconductors, piezoelectric, ferroelectric, etc.) to be deposited in the form of thin films over different substrates (polymers, ceramics, metals, etc.). The variety of materials that can be deposited allows the design of sol-gel structures in the form of photonic band gap devices or photonic crystals.

Bragg Reflectors or BRs in 1D are the photonic crystals which have achieved greater development due to the sol-gel. Very high reflectivities are obtained in these materials due to the Bragg reflection phenomenon. In general, they are produced by alternating layers of materials with a high and low refractive index, forming a stack of dielectric multilayers. BRs synthesised by sol-gel can be obtained by spin-coating [R. M. Almeida, S. Portal, *Photonic band gap structures by sol-gel processing*, Current Opinion in Solid State and Materials Science 7 (2003) 151. R. M. Almeida, A. S. Rodrigues, *Photonic bandgap materials and structures by sol-gel processing*, Journal of Non-Crystalline Solids 326&327 (2003) 405. P. K. Biswas, D. Kundu and D. Ganguli, *Preparation of wavelength-selective reflectors by sol-gel processing*, J. Mater. Sci. Lett. 6 (1987) 1481] or dip-coating [Chen K. M., Sparks A. W., Luan H. C., Lim D. R., Wada K., Kimerling L. C., $SiO_2/TiO_2$, *omnidirectional reflector and microcavity resonator via the sol-gel method*, Appl. Phys. Lett. 75 (1999) 3805. Hang Q., Li X., Shen J., Wu G., Wang J., Chen L., $ZrO_2$ *thin films and $ZrO_2/SiO_2$ optical reflection filters deposited by sol-gel method*, Mater. Lett. 45 (2000) 311. S. Rabaste, J. Bellessa, A. Brioude, C. Bovier, J. C. Plenet, R. Brenier, O. Marty, J. Mugnier, J. Dumas, *Sol-gel manufacturing of thick multilayers applied to Bragg reflectors and microcavities*, Thin Solid Films 416 (2002) 242]. The differences between the refractive index values of the materials used and the number of layers are the most important BR parameters. On increasing the difference between the n of the layers and on increasing the number of layers, the greater the reflectivity of the Photonic Band Gap or PBG, forbidden range of wavelengths from the UV to the NIR which are reflected by the dielectric minor. In general, $SiO_2$, $TiO_2$ and $ZrO_2$ are used due to the significant difference between their refractive indices (1.45-1.52, 2.07-2.55, 2.1-2.2, respectively).

The problem with this type of synthesis lies in the fact that, on increasing the number of layers, the risk of fissure development in the material which can damage the structural integrity of the multilayer also increases. In order to solve this problem, Almeida et al. [R. M. Almeida, A. S. Rodrigues, *Photonic bandgap materials and structures by sol-gel processing*, Journal of Non-Crystalline Solids 326&327 (2003) 405] and Rabaste et al. [Rabaste, J. Bellessa, A. Brioude, C. Bovier, J. C. Plenet, R. Brenier, O. Marty, J. Mugnier, J. Dumas, *Sol-gel manufacturing of thick multilayers applied to Bragg reflectors and microcavities*, Thin Solid Films 416 (2002) 242] have used very short thermal densification treatments at very high temperatures (1,000° C. for 90 seconds and 900° C. for 2 seconds, respectively), thereby obtaining a stack of up to 60 layers with thicknesses ranging between 80 nm and 100 nm, with a reflectivity of more than 99% (normal incidence). Thermal densification treatments are carried out after the synthesis of each of the layers and, on using such high temperatures, crystallization of the $TiO_2$ of the first layers cannot be avoided, the first layers being subjected to high temperatures for longer time periods due to the reiterated thermal treatments they undergo. Crystal growth must be carefully controlled as it deteriorates multilayer optical quality on introducing Rayleigh dispersion and due to the roughness generated in the interface with the SiO2 layers. Additionally, the first layers undergo a degree of densification different from that of the last layers, which are subject to high temperatures for shorter time periods; this non-homogeneous densification also entails lower multilayer optical quality on modifying optical thickness. [P. K. Biswas, D. Kundu and D. Ganguli, *Preparation of wavelength-selective reflectors by sol-gel processing*, J. Mater. Sci. Lett. 6 (1987) 1481. Rabaste, J. Bellessa, A. Brioude, C. Bovier, J. C. Plenet, R. Brenier, O. Marty, J. Mugnier, J. Dumas, *Sol-gel manufacturing of thick multilayers applied to Bragg reflectors and microcavities*, Thin Solid Films 416 (2002) 242].

Porous Silicon (pSi) Multilayers Obtained by Electrochemical Dissolution, Alternating Layers of Different Porosity The aforementioned characteristics make these materials excellent candidates for chemical [V. Tones-Costa, F. Agulló-Rueda, R. J. Martín-Palma, J. M. Martínez-Duart, *Porous silicon optical devices for sensing applications*, Optical Materials 27 (2005) 1084. T. Gao, J. Gao, and M. J. Sailor, *Tuning the Response and Stability of Thin Film Mesoporous Silicon Vapor Sensors by Surface Modification*, Langmuir 18 (25) (2002) 9953. Snow, P. A., Squire, E. K.; Russell, P. S. J.; Canham, L. T., *Vapor sensing using the optical properties of porous silicon Bragg mirrors*, J. Appl. Phys. 86 (1999) 1781] and biochemical sensors [V. S.-Y. Lin, K. Motesharei, K.-P. S. Dancil, M. J. Sailor, M. R. Ghadiri, Science 278 (1997) 840].

A large number of layers without the structural integrity problems of multilayer films obtained by sol-gel in the form of BRs can be obtained, and the thickness and porosity of each layer can be controlled in a very precise manner. The main problem of these materials is their long-term altered stability. The application of pSi BRs in air or aqueous media generates oxide on the surface in just a few hours, due to which they must be chemically modified to increase their oxidation resistance.

Multilayers of Laminae with Ordered Mesopores

This type of multilayer is manufactured by the alternating deposition, using spin-coating (S. Y. Choi, M. Mamak, G. von Freymann, N. Chopra, G. A. Ozin, *Mesoporous Bragg Stack Color Tunable Sensors*, Nano Letters 6 (2006) 2456) or dip-coating techniques (M. C. Fuertes, G. Soler-Illia, H. Míguez, Spanish patent with application number: 200602405), of laminae with ordered mesopores which are obtained using a template or organic mould combined with the compounds that give rise to the inorganic phase in the precursor solution which is deposited to form each layer. The porosity of these layers allows modification of their optical response by the infiltration of liquids. The possibility of functionalizing the mesopore walls in turn allows this response to be selective to a specific type or group of compounds.

Multilayers of Colloidal Particles

There is a reference in the scientific literature [I. M. Thomas, *Single layer $TiO_2$ and multilayer $TiO_2$—$SiO_2$ optical coatings prepared from colloidal suspensions*, Applied Optics 26 (1987) 4688] to a paper wherein multilayers of alternating colloidal $TiO_2$ particles are claimed to have been achieved, with sizes comprised between 10 nm and 20 nm, and $SiO_2$ particles 10 nm in size. The technique used is spin-coating. In this paper, however, the microstructure of the material obtained is neither characterized nor described, nor is its mesoporosity demonstrated, by providing only an optical reflectance measure where a maximum can be observed. The applications proposed in this paper are focused on optical coatings with high heating resistance when irradiated by a high-power laser.

DETAILED DESCRIPTION OF THE PREFERRED EMBODIMENTS

Figure 1:
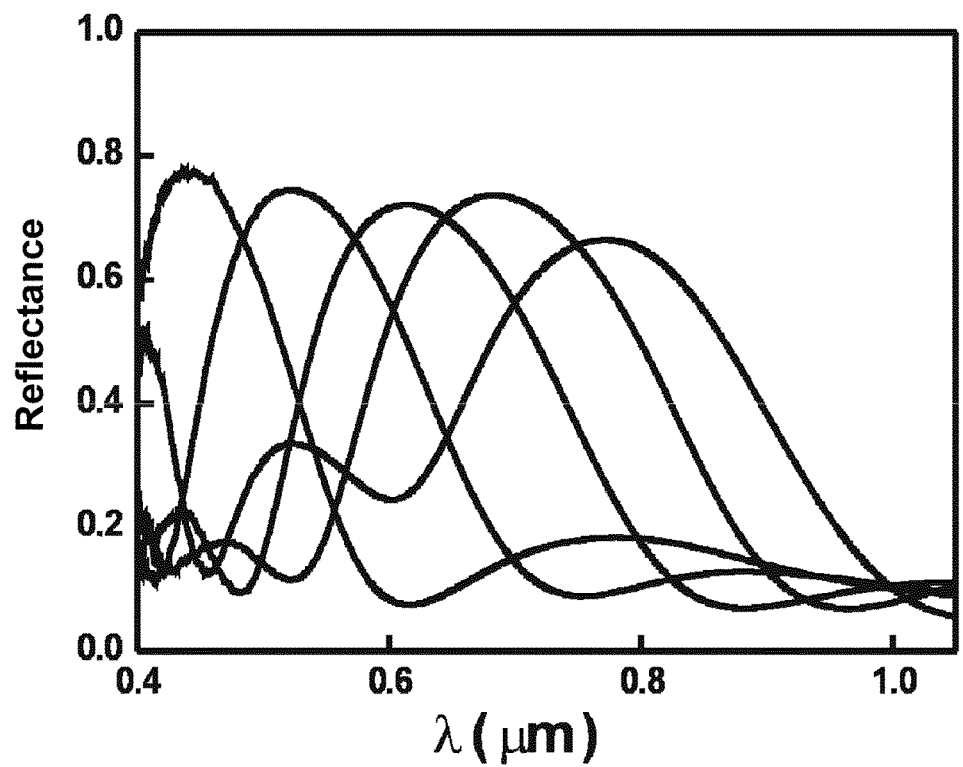
FIG. 1 shows the specular reflectance spectra for different unidimensional photonic crystals composed of laminae with a controlled thickness of $SiO_2$ and $TiO_2$ nanoparticles.

A mesoporous multilayer structure with the properties of a Bragg reflector or unidimensional photonic crystal, hereinafter referred to as a nanoparticulate multilayer structure, which comprises periodically alternating laminae with different refractive indices, each of a thickness between 1 nm and 200 nm and composed of nanoparticles, is disclosed herein. The nanoparticulate multilayer structure is deposited on a substrate during the production process, wherein nanoparticles of several different materials may be used, conferring a different refractive index to each lamina and, therefore, different characteristics to each multilayer structure.

A process for manufacturing the nanoparticulate multilayer structure having unidimensional photonic crystal properties, which comprises the following steps:

a) preparation of suspensions of particles of nanometric size between the range of 1-100 nm, the composition of which will be that of any material that can be obtained in nanoparticulate form, where the suspension medium is any liquid wherein said particles may become dispersed, and where the concentration thereof is comprised between 1% and 99%, and b) formation of the structure through the alternating deposition, on any substrate, of laminae of a controlled nanoparticle thickness based on the suspension described in a), in such a manner that an alternation in the refractive value index is created and wherein the thickness of each of the nanoparticle laminae that form the multilayer is comprised between 1 nm and 1 micron, and where the number of nanoparticulate laminae present in the multilayer may range between 1 and 100 layers, is also disclosed.

The use of the nanoparticulate multilayer structure in the preferred production of optical elements to be used, by way of example and without limitation, preferably, in sensor devices, photoelectrochemical devices, colored coatings and reflective coatings, is described herein.

The inventors have observed that it is possible to obtain, from a new process wherein optically uniform nanoparticle laminae are periodically alternating, a new mesoporous multilayer structure (having pores between 1 nm and 100 nm) with an alternating refractive index and high reflectance at different wavelengths. These properties of a Bragg reflector or unidimensional photonic crystal are observed in the ultraviolet, visible and infrared ranges close to the electromagnetic spectrum. This unidimensional photonic crystal formed by laminae having different refractive indices and controlled thickness composed of nanoparticles may be deposited on different types of substrates using a simple and reliable method.

This periodic multilayer of high interconnected porosity, which is accessible from the exterior and has unidimensional photonic crystal properties, is formed through the alternating deposition of laminae of oxide or semiconductor nanoparticles of a controlled thickness, in such a manner that a periodic alternation in the refractive index value is created. This alternation gives rise to the behavior of the photonic crystal of the multilayer.

The periodic alternation of laminae having different refractive indices gives rise to high reflectance which can easily be observed with the naked eye and can be measured with a spectrophotometer. In contrast to other dense, reflective structures, the mesoporous structure of this reflector is such that it allows the diffusion of liquids therethrough. This gives rise to the possibility of modifying, in a controlled manner, the color of the multilayer structure in accordance with the infiltrated liquid and is therefore a material which can be used in the manufacturing of a sensor. The proven nanoparticulate nature of each layer that forms the multilayer implies a significant qualitative structural difference with respect to mesoporous multilayers manufactured in the past.

A mesoporous multilayer structure with the properties of a Bragg reflector or unidimensional photonic crystal, referred to herein as a nanoparticulate multilayer structure, which comprises periodically alternating laminae with different refractive indices, each of a thickness between 1 nm and 200 nm and composed of nanoparticles, is disclosed. The nanoparticulate multilayer structure is deposited on a substrate during the production process, wherein nanoparticles of several different materials may be used, conferring a different refractive index to each lamina and, therefore, different characteristics to each multilayer structure.

A nanoparticulate multilayer structure, which comprises laminae with nanoparticles of different materials (Example 2, FIG. 3) is disclosed herein.

A nanoparticulate multilayer structure, which comprises laminae with nanoparticles of the same material (Example 3, FIG. 4) is also disclosed.

The nanoparticles present in the nanoparticulate multilayer structure may be of any material that can be obtained in the form of nanoparticles of a size between 1 nm and 100 nm, and which allow the desired refractive index contrast between the laminae to be obtained. The nanoparticle material, by way of an example and without limitation, may be any of the following: metal oxides, metal halides, nitrides, carbides, chalcogenides, metals, semiconductors, polymers or combinations thereof. More preferably, the oxides are inorganic oxides, both in their amorphous or crystalline phase; and most preferably, are at least one of $SiO_2$, $TiO_2$, $SnO_2$, $ZnO$, $Nb_2O_5$, $CeO_2$, $Fe_2O_3$, $Fe_3O_4$, $V_2O_5$, $Cr_2O_3$, $HfO_2$, $MnO_2$, $Mn_2O_3$, $CO_3O_4$, $NiO$, $Al_2O_3$, $In_2O_3$, and $SnO_2$ and combinations thereof.

A nanoparticulate multilayer structure, wherein the selected nanoparticules are of a material belonging to the following groups: $SiO_2/TiO_2$ and $SiO_2/SnO_2$ is disclosed herein. Examples of structures composed of these nanoparticles are shown in Examples 1, 2, 4, 5 and 6.

Also disclosed is a nanoparticulate multilayer structure having laminae with nanoparticles, of the same or different material, but with a different distribution of nanoparticle sizes. The difference or equivalence in nanoparticle size determines different porosity and confers a different refractive index to each layer.

Figure 4:
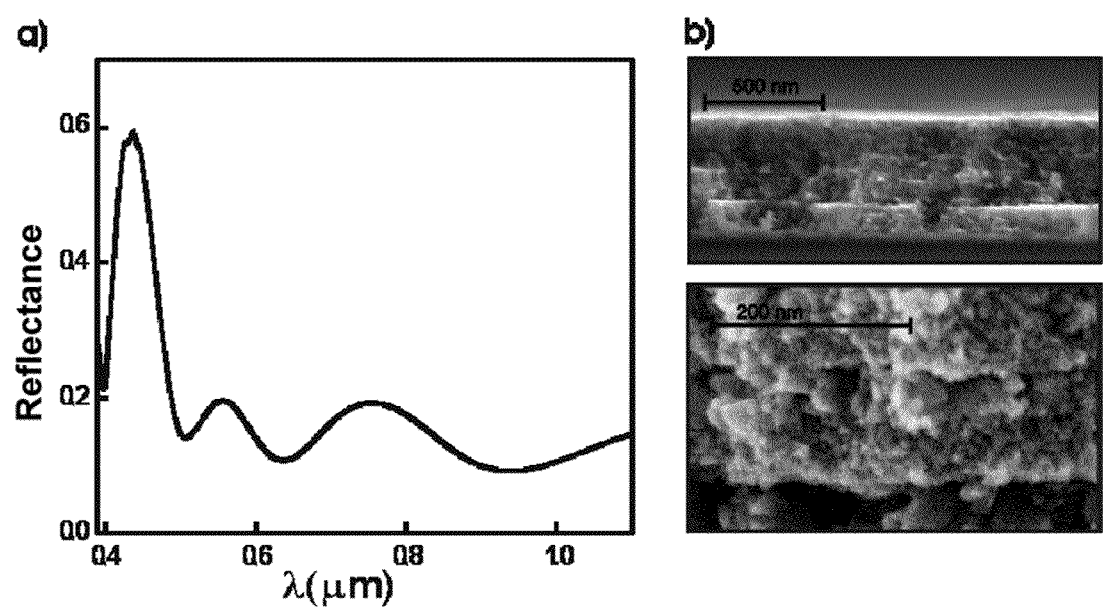
FIG. 4 is the reflectance spectrum (a) and SEM images (b) of the cross-section of a photonic crystal according to one aspect of the disclosure.

Another embodiment consists of a nanoparticulate multilayer structure, which comprises laminae with nanoparticles, of the same material, such as for example $TiO_2$, but with a different nanoparticle size distribution (Example 3, FIG. 4).

A nanoparticulate multilayer structure, which comprises one or several ruptures in the periodicity of the laminae, is disclosed. This nanoparticulate multilayer structure has a spatial periodicity interrupted by the presence of a lamina of greater depth or thickness with respect to those that form the periodicity, in such a manner that default optical states are generated in the unidimensional photonic crystal. This nanoparticulate multilayer structure with periodicity rupture or interruption can also be extended through the inclusion of laminae of different thicknesses, for example between 1 nm and 200 nm, formed of nanoparticles of different material and size and, therefore, porosity.

On the other hand, the final properties of the different mesoporous multilayer structures that can be manufactured, which shall be determined according to the subsequently desired applications, are controlled by means of different parameters that intervene in the manufacturing process:

a) the concentration of oxide particles in starting suspensions, which allows the thicknesses of each of the laminae deposited to be modified in a controlled manner, showing a clear example of the effect of this modification in the concentration of precursor colloidal suspensions in the optical properties of FIG. 1;

b) through the preparation of said multilayer structures with the use of the same particulate material but with different porosity, as described in Example 3 and as we can observe in FIG. 4;

c) through the intentional rupture in the periodicity of the multilayer structure, which gives rise to the creation of optical defect states to which special optical properties are associated;

d) through the number of laminae inserted in the structure, in such a manner that the increase in the number of laminae allows an increase in the intensity of the reflection maximums, which are characteristic of the multilayer structures with photonic crystal properties (FIG. 2); and e) deposition of the laminae at different rotation speeds allowed reflectance spectra to be obtained for a wide wavelength range.

A manufacturing process of the nanoparticulate multilayer structure with unidimensional photonic crystal properties, which includes the following steps:

a) preparation of suspensions of particles of nanometric size comprised within the range of 1-100 nm, the composition of which is that of any material that can be obtained in the form of nanoparticles, where the suspension medium is any liquid wherein these particles may become dispersed and where the concentration thereof is between 1% and 99%; and b) formation of the disclosed structure through the alternating deposition, on any substrate, of laminae with controlled nanoparticle thickness from the suspensions described in a) in such a manner as to create an alternation in refractive index value and wherein the thickness of each of the laminae of nanoparticles that form the multilayer is between 2 nm and 1 micron and where the number of nanoparticulate laminae present in the multilayer may range between 1 and 100 layers, is also disclosed herein.

As mentioned earlier, the nanoparticles of the disclosed process may be of any material that can be obtained in the form of nanoparticles of a size between 1 nm and 100 nm. Preferably, the materials used in the form of nanoparticles (or a combination thereof) for the deposition of the multilayer structure with photonic crystal properties will be those which allow the desired refractive index contrast between the layers to be obtained. Preferably, the composition can be that of any of the metal oxides, metal halides, nitrides, carbides, chalcogenides, metals, semiconductors, polymers or a combination thereof. Preferably, these materials are at least one of $SiO_2$, $TiO_2$, $SnO_2$, $ZnO$, $Nb_2O_5$, $CeO_2$, $Fe_2O_3$, $Fe_3O_4$, $V_2O_5$, $Cr_2O_3$, $HfO_2$, $MnO_2$, $Mn_2O_3$, $Co_3O_4$, $NiO$, $Al_2O_3$, $In_2O_3$, $SnO_2$, $CdS$, $CdSe$, $ZnS$, $ZnSe$, $Ag$, $Au$, $Ni$, $Co$, $Se$, $Si$, and $Ge$. Most preferably, the selected nanoparticles are at least one of $SiO_2$, $TiO_2$ and $SnO_2$. Examples of structures composed of these nanoparticles are shown in examples 1, 2, 4, 5 and 6.

The precursor dispersions or suspensions for obtaining the thin laminae of nanoparticles that form the multilayer structure use any dispersing agent thereof as a liquid medium. Preferably, this liquid medium will also be volatile. Preferably, this liquid medium is at least one water, alcohols, and aliphatic, alicyclic or aromatic hydrocarbons. More preferably, water, ethanol, ethylene glycol and methanol, pure or combined in any proportions, and with a concentration by weight of the compound in the medium between 1% and 99% will be used.

The precursor suspensions of nanoparticles of the different laminae that are used in the disclosed process can be of the same or a different material and, at the same time, each lamina of which they form part in the multilayer can have a different porosity due to the use of a same or different nanoparticle size, in such a manner that it gives rise to a different refractive index in each. An example of preparation of this alternative is described in Example 3.

The deposition of the layers of step (b) can be carried out using different methods for each of these laminae, and can be any that allows a lamina of uniform thickness between 2 nm and 1 micron to be obtained, belonging, by way of example and without limitation, to the following group: spin-coating, dip-coating and Langmuir-Blodgett. More preferably, the technique used is that of spin-coating, as it is normally used in the preparation of thin laminae of different materials and in the preparation of planarised devices.

On the other hand, and with the object of creating a controlled optical defect in the nanoparticulate multilayer structure of the disclosure, a defect or rupture in the periodicity of the multilayer structure may be intentionally included during step (b) of the deposition of laminae of the process, for example, through the presence of a lamina of greater thickness.

In the case of the particular embodiments carried out herein, crystals such as substrates that were cleaned and treated using known processes were used which, in the same manner as in the techniques used can be easily carried out, with the information disclosed herein, by a person skilled in the art.

When the multilayer structure is processed following the general process expounded in the preceding sections, a multilayer is obtained with properties of a Bragg reflector or unidimensional photonic crystal in a wide wavelength range (Examples 1, 2, 3 and 4). The reflectance obtained in each case will depend, to a great extent, on the thicknesses of the laminae formed with the nanoparticles of the materials with different refractive indices. Said thicknesses can be controlled with some parameters of the deposition process, such as substrate rotation speed if the technique used is spin-coating, or through the prepared dispersions of nanoparticles.

The interruptions in the periodicity of the multilayer structure (for example, for creating optical defects in volume) are obtained from suspensions of nanoparticles prepared as described in step (a). Preferably, the material that will allow us to obtain the desired refractive index in the optical defect or dopant introduced into the multilayer structure will be selected from this group. An example of a nanoparticulate multilayer structure obtained wherein an optical defect or dopant has been introduced in a controlled manner is shown in Example 5.

On the other hand, the nanoparticulate multilayer structure may be used as starting material, in order to enhance the properties of the structure through modifications or additions; said modifications can be carried out by a person skilled in the art and with the extant information in the current state of the art.

As described in Example 6, the reflectance spectrum of the nanoparticulate multilayer structure can be modified upon infiltration of solvents with a different refractive index within the structure, in such a manner that this structure can serve as an optical sensor for certain liquids.

The use of the mesoporous nanoparticulate multilayer structure in the manufacturing, preferably, of optical elements to be used in, by way of example and without limitation, preferably, sensor and photoelectrochemical devices, colored coatings, and reflective coatings, is further described herein.

The use of the mesoporous nanoparticulate multilayer structure, wherein the optical element is a sensor device of compounds in the liquid or gaseous phase, or dispersed in the form of nanoparticles, making use of the high interconnected porosity of the nanoparticulate multilayer structure and of the dependence of its color on the refractive index of the infiltrated compound, is disclosed. Different examples that illustrate this property are shown in Example 6 herein.

The use of the mesoporous nanoparticulate multilayer structure, wherein the optical element is a colored coating of ornamental or technological application, such as reflective coatings of a wavelength range of interest, is disclosed.

The use of the mesoporous nanoparticulate multilayer structure, wherein the optical element is a reflective coating of a wavelength range of interest in photovoltaic and photocatalytic devices, where the implementation of high-reflectance and, at the same time, porous minors can serve to increase their efficiency, is further disclosed.

These previously described coatings may be used in the colored coating of materials, for example, ceramics.

Turning now to FIG. 1, we see the specular reflectance spectra for different unidimensional photonic crystals composed of laminae with a controlled thickness of $SiO_2$ and $TiO_2$ nanoparticles. The multilayer structure, in all cases, consists of a stack of six alternating laminae of said materials obtained from silica dispersions, with concentrations that vary between 1-6% by weight, and titanium oxide, 5% by weight in all cases. The liquid medium of the suspension is a combination of solvents with a proportion of 79% by volume of methanol and 21% of water. Substrate rotation speed is fixed at ω=100 rps. The variation in thickness of the silica laminae deposited, controlled by means of the suspensions used, gave rise, as can be observed in the Figure, to photonic gap positions of different wavelengths.

Figure 2:
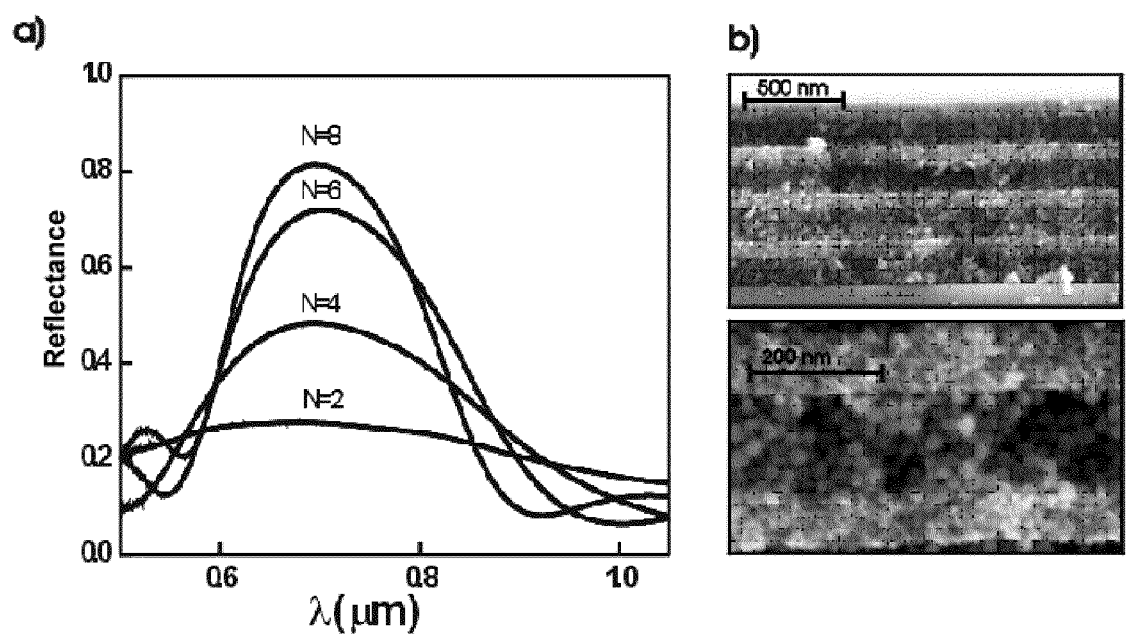
FIG. 2 illustrates the evolution of the optical response of a multilayer structure with photonic crystal properties.

FIG. 2 shows the evolution of the optical response of a multilayer structure with photonic crystal properties. This evolution has been obtained by stacking eight alternating $SiO_2$ and $TiO_2$ laminae, the number of layers being (N). As can be observed, as the number of layers in the system increases, the reflection peak narrows and grows in intensity. The suspensions used, both in silica and in titanium oxide, were 5% by weight with a mixture of methanol (79% by volume) and water (21% by volume). The rotation speed used during the deposition process was 100 rps. Likewise, SEM images of the cross-section of the unidimensional photonic crystal are shown.

Figure 3:
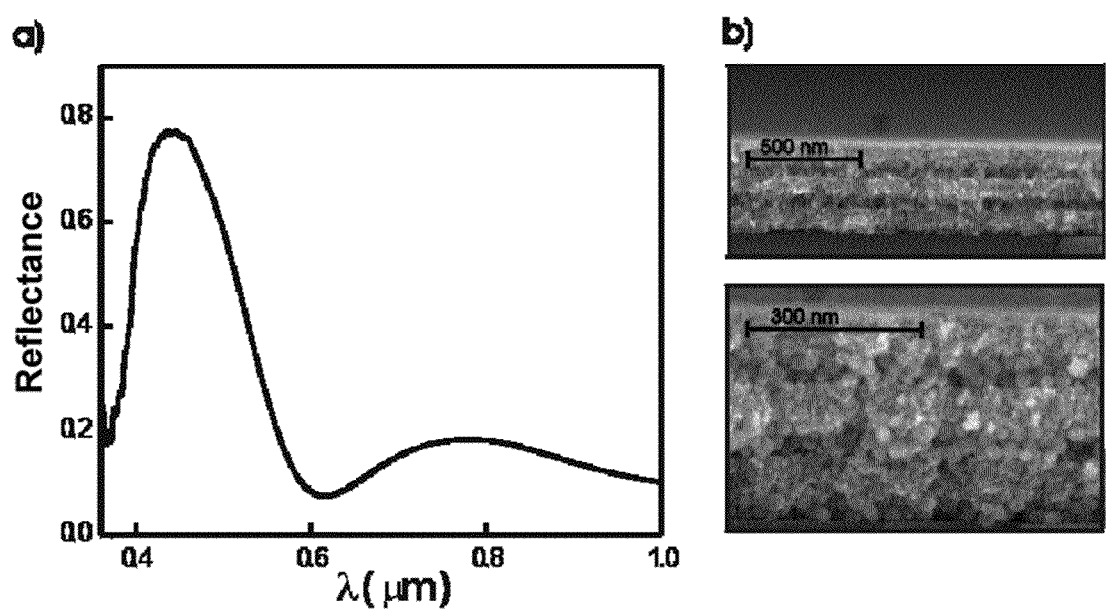
FIG. 3 is the specular reflectance (a) and images of scanning electron microscopy (SEM) (b) for a photonic crystal according to one aspect of the disclosure.

FIG. 3 shows the specular reflectance (a) and images of scanning electron microscopy (SEM) (b) for a photonic crystal. The photonic crystal is a 6-layer unidimensional crystal formed of laminae with a controlled thickness of silica and titanium oxide nanoparticles. The concentrations of the suspensions used were 2% of silica and 5% of titanium oxide, with a content of 79% by volume of methanol and 21% of water. Substrate rotation speed is 100 rps. The different thicknesses of the silica laminae deposited with respect to the previous figure can be compared in the SEM images.

FIG. 4 shows the reflectance spectrum (a) and SEM images (b) of the cross-section of a photonic crystal. The photonic crystal is a unidimensional crystal obtained by stacking laminae of the same material with different porosity. This multilayer structure was obtained using nine laminae alternating 8.5% by weight (water) of titanium oxide with a different size distribution. Substrate rotation speed during the deposition process was 125 rps. The reflection peak is narrower due to the lower refractive index contrast between the layers, and high reflectances can also be obtained in a wide wavelength range.

Figure 5:
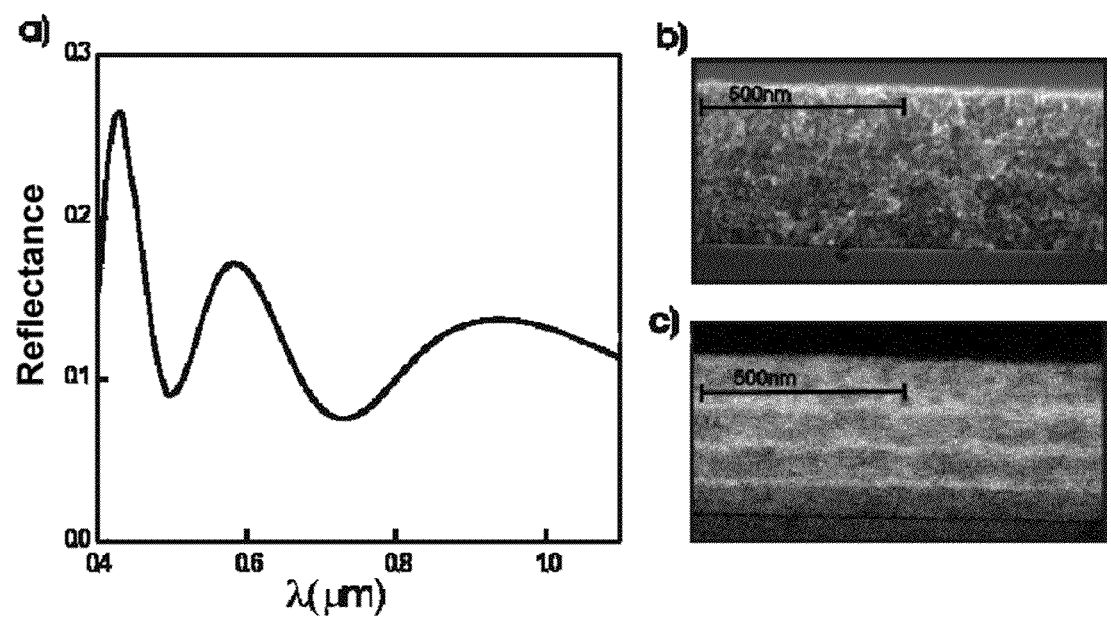
FIG. 5 is the reflectance spectrum (a), SEM images (b), and composition analysis (c) of the cross-section of a unidimensional photonic crystal.

FIG. 5 shows the reflectance spectrum (a) and SEM images (b) of the cross-section of a unidimensional photonic crystal. The crystal has been obtained by stacking laminae of nanoparticles of titanium oxide and tin oxide. This multilayer structure is achieved using seven laminae alternating both materials. In the case of $TiO_2$, suspensions at 5% by weight, with a mixture of 79% by volume of methanol and 21% by volume of water and, in the case of $SnO_2$ suspensions, at 4.5% of water were used. The rotation speed applied was 100 rps. The similar morphology of the particles makes them difficult to distinguish, for which an analysis of the composition (FIG. 5(c)) has been included, wherein the different contrast due to the different materials deposited in each lamina can be observed.

Figure 6:
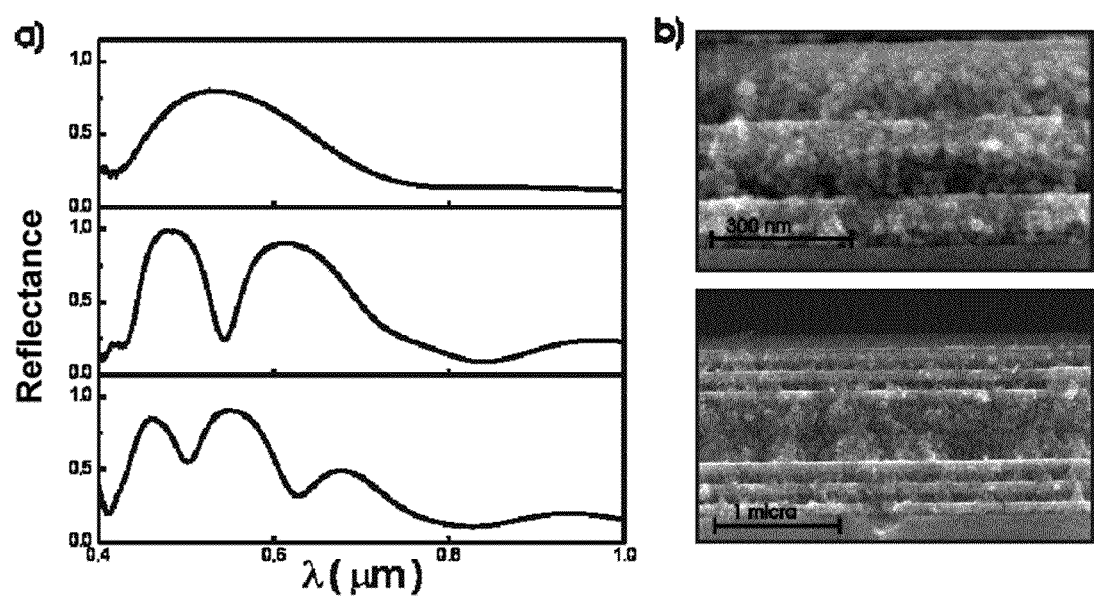
FIG. 6 is the reflectance spectrum (a) and SEM images (b) for a photonic crystal with a multilayer structure wherein a defect by volume of silica has been embedded.

FIG. 6 shows the reflectance spectrum (a) and SEM images (b) for a photonic crystal with a multilayer structure wherein a defect by volume of silica has been embedded. The reflectance spectra show the optical response of a multilayer of six laminae of $SiO_2$—$TiO_2$, obtained from silica suspensions at 3% and titanium at 5% by weight with a content of 79% by volume of methanol and 21% by volume of water, in addition to that obtained for different thicknesses in the silica defect. On increasing the thickness of the defect, the states of the defect within the photonic gap also increase. In the SEM images, cross-sections of the multilayer structure are shown, in addition to that of the defect by volume within the photonic crystal.

Figure 7:
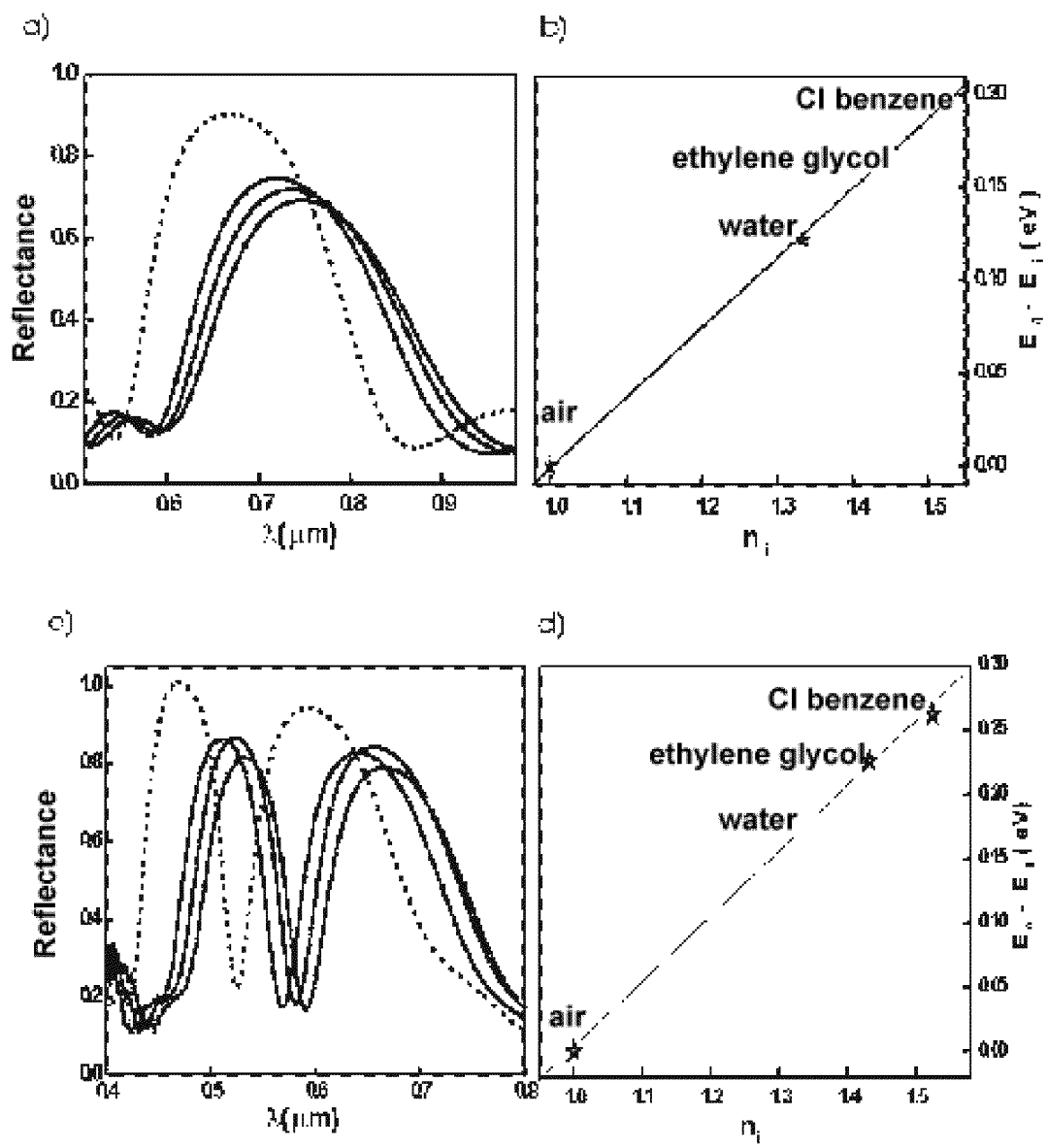
FIG. 7 shows modification of the optical response of the nanoparticulate multilayer structure with properties of a photonic crystal on being infiltrated with solvents having different refractive indices.

FIG. 7 illustrates a modification of the optical response of the nanoparticulate multilayer structure with properties of a photonic crystal on being infiltrated with solvents having different refractive indices. This study is carried out using a photonic crystal with a multilayer structure formed by stacking eight alternating $SiO_2$—$TiO_2$ laminae, at 5% by weight, and, with a photonic crystal wherein a defect by volume of silica has been embedded, using suspensions at 3% and 5% by weight with a defect obtained by repeating the silica deposition process three times. The suspensions used contain a solvent mixture with a content of 79% by volume of methanol and 21% by volume of water. In both cases, the infiltrated solvents are water, ethylene glycol and chlorobenzene. In addition to the reflectance spectra, energy variation (eV) based on the refractive index of the solvent used in each case is represented.

It will be apparent to those skilled in the art that various modifications and variations can be made to the disclosure and specific examples provided herein without departing from the spirit or scope of the invention. Thus, it is intended that the invention covers the modifications and variations of this invention that come within the scope of any claims and their equivalents.

The following examples are for illustrative purposes only and are not intended, nor should they be interpreted to, limit the scope of the invention.

EXAMPLES

Example 1

Process for Preparing a Multilayer Structure with the Properties of a Photonic Crystal Using Colloidal Silica and Titanium Oxide Nanoparticles with a Maximum of Reflectance at 685±5 nm In this example, multilayer structures with high reflectances will be grown, alternating materials in the form of nanoparticles which allow a high the refractive index contrast between the layers to be obtained. More specifically, amorphous silica (Ludox colloidal suspension 34% by weight, Aldrich) was used, with a size comprised in the range of 25-40 nm and crystalline titanium oxide (in anatase phase). The latter was obtained in the form of nanoparticles in colloidal suspension, synthesized after a process of hydrolysis, condensation and peptisation in a basic medium and under hydrothermal conditions (120° C. for 3 hours). The reactives used are titanium (IV) tetraisopropoxide (20 mL), Milli-Q water (36 mL) and tetramethylammonium hydroxide 0.6 M (3.9 mL). The resulting suspension was centrifuged as many times as necessary at 14,000 rpm for 10 minutes to eliminate a possible fraction of aggregates present in the sample. The suspension of titanium oxide nanocrystals thus obtained, with a concentration of 24% by weight, has a particle size comprised within the range of 5-15 nm. After having obtained the colloidal suspensions of both oxides, the original dispersions, of both silica and titania, were diluted with methanol and distilled water (if necessary) until reaching 5% by weight of oxide. The final methanol content in both cases was 79% by volume. The suspensions thus prepared were thoroughly homogenized and reserved to be used in the spin-coat deposition process.

The glass substrates, 2.5 cm×2.5 cm in size, were prepared prior to the deposition process, being cleaned and treated in the following manner: firstly, they were washed with distilled water, acetone and ultrasonicated for 30 minutes in carbon tetrachloride; next, they were washed with isopropanol, distilled water and once again ultrasonicated in a mixture of sulphuric acid and hydrogen peroxide in a volumetric proportion of 4:1 for 1 hour; and, finally, were washed with distilled water several times. After all this treatment, the substrates to be used were thoroughly cleaned with ethanol and dried using a nitrogen gas current.

In order to obtain the multilayer structure over the glass substrate, the dispersions prepared at 5% by weight with a methanol content of 79% by volume and the rest by water were used. The substrate was placed on the spin coater sample holder, a rotation speed of 100 rps was applied and a volume of 250 µL of silica suspension was added, maintaining rotation for 1 minute after said addition. An equal volume of nanoparticles of titanium oxide was dispensed over the deposited silica lamina, completely covering the substrate surface, and a rotation speed of 100 rps was applied for 1 minute. By repeating this process, until achieving a total number of 8 layers alternating in $SiO_2$ and $TiO_2$, the photonic crystal with the desired multilayer structure was obtained.

FIG. 2 presents the result in terms of optical response, layer morphology and thickness thereof in the photonic crystals with multilayer structure obtained by means of this process. FIG. 2a shows the specular reflectance spectra measured in the same zone of the photonic crystal on increasing the number of layers. FIG. 2b shows images of the cross-section of the multilayer structure obtained by scanning electron microscopy (SEM).

Example 2

Process for Preparing a Multilayer Structure with the Properties of a Photonic Crystal Using Colloidal Silica and Titanium Oxide Nanoparticles with a Maximum of Reflectance at 445±5 nm In this example, the same colloidal suspensions used in the previous example were used. The use of different concentrations in the dispersions and/or the deposition of the laminae at different rotation speeds allowed reflectance spectra to be obtained in a wide wavelength range. In this case, the possibility of controlling Bragg peak position by modifying the concentrations of the suspensions used for the deposition (more specifically, for the dispersion of silica), maintaining the rest of the parameters constant. To this end, a suspension of silica was prepared with a concentration of 2% by weight and a solvent mixture of 79% and 21% by volume of methanol and water. The suspension of titanium oxide used was identical to that of Example 1. The glass substrates used were also prepared in the previously described form. The results obtained in this case are shown in FIG. 3 for a multilayer grown by stacking 6 alternating $SiO_2$—$TiO_2$ layers, where the different position of the reflectance peak can be observed (FIG. 3a) as compared to the preceding example, and the lesser thickness in the silica layers shown in the SEM images of a cross-section thereof (FIG. 3b). In this manner, it was demonstrated that, on altering the concentration of the suspensions used in the spin-coating process, the thickness of the laminae obtained was modified and, therefore, the network parameter of our photonic crystal, leading to a different optical response in each case.

Example 3

Process for Preparing a Multilayer Structure with the Properties of a Photonic Crystal Using the Same Particulate Material with Different Size Distribution In this example, colloidal suspensions of the same material, titanium oxide, were used, obtained by a synthesis process at different temperatures. It was demonstrated that the different size distribution achieved in both synthesis processes gives rise to a variation in the porosity of the material and, therefore, to a different refractive index; i.e. unidimensional photonic crystals with reflectances in a wide wavelength range can be obtained using colloidal suspensions of the same material. The synthesis method used to obtain said suspensions is that described in Example 1. One of the colloidal suspensions was obtained after the hydrothermal synthesis at 120° C. detailed in said example; while the other, with a different size distribution, was obtained using the same amounts of reactives with the exception that, after hydrothermal synthesis at 120° C., subsequent heating is carried out at a higher temperature, more specifically at 190° C. for 4.5 hours. After this treatment at a higher temperature, the resulting suspension was centrifuged at 3,000 rpm for 10 minutes. In both cases, titanium oxide is in anatase crystalline phase. The suspensions obtained with a concentration by weight of 24% (120° C.) and 16% (190° C.) were diluted with distilled water up to a concentration of 8.5% by weight in both cases.

The multilayer structure is achieved by alternating the suspensions prepared from the $TiO_2$ nanoparticles obtained after synthesis at 190° C. and 120° C., respectively. In this specific example, the nanoparticles synthesized at 190° C. are larger, and it was observed that each suspension had a different size distribution and not only a different average value, which is key to achieving the properties of the disclosed structure. A volume of suspension of 250 µL was dispensed on the treated substrates, as specified earlier in detail, and a rotation speed of 125 rps was maintained for 1 minute. After stacking 9 layers, the results presented in FIG. 4 were obtained. FIG. 4a shows the detailed response in terms of specular reflectance of the multilayer structure consisting of the same material, in addition to scanning electron microscopy images (FIG. 4b) where the different morphologies of the deposited nanoparticles can be observed.

Example 4

Process for Preparing a Multilayer Structure with the Properties of a Photonic Crystal Using Colloidal Titanium Oxide and Tin Oxide Nanoparticles In this example, the process for obtaining multilayer structures with materials, the refractive index contrast of which is not as high as in the case of the silica and titanium oxide, is described. More specifically, in this example colloidal $TiO_2$—$SnO_2$ particles were used as precursor materials of the structure. The suspension of titanium oxide nanoparticles was prepared from that obtained at 120° C., diluting with methanol until reaching 5% by weight. On the other hand, the colloidal tin oxide particles are prepared using a forced hydrolysis method at high temperatures, which favors the hydrolysis and condensation of the aquocomplexes formed in the solution. The synthesis was carried out preparing 0.5 L of a dissolution of tin (IV) chloride-pentahydrate 0.003 M (537 mg) in HCl 0.3 M. Aging of the dissolution in a heater for 2 hours at 100° C. gave rise to $SnO_2$ nanoparticles, which were centrifuged and washed three times with distilled water, and redispersed in a volume of 2 mL of distilled water.

The multilayer structure was achieved by alternating the colloidal titanium oxide and tin oxide, dispensing a volume of 250 µl over the glass substrate and applying a rotation speed of 100 rps for 1 minute. FIG. 5a shows the reflectance spectrum obtained for a multilayer structure of seven laminae alternating $TiO_2$—$SnO_2$, with its corresponding scanning electron microscopy (FIG. 5b). In this case, the similar morphology and size of the different nanoparticles does not allow the different thicknesses of each of the laminae to be distinguished. This can be observed in the images of redispersed electrons under the electron microscope, more sensitive to the presence of materials of different electronic density, such as the $TiO_2$ and $SiO_2$. This can be clearly observed in FIG. 5c, where the different contrast of the photo indicates the alternation of materials and their corresponding thicknesses.

Example 5

Process for Preparing a Multilayer Structure Having Photonic Crystal Properties Using Colloidal Silica and Titanium Oxide Nanoparticles with a Defect by Volume of Silica In this example, it was demonstrated that an interruption in the periodicity of the photonic crystal with multilayer structure can be obtained introducing a lamina of greater thickness, which gives rise to defect states within the photonic gap; i.e. wavelengths within the forbidden gap band that can be transmitted appear. Specifically, in this example the process for obtaining a defect in the volume of silica within a multilayer structure with the materials used in Examples 1 and 2 is described. In this case, suspensions of silica and titanium oxide at 3% and 5% by weight, respectively, with a content of 79% by volume of ethanol were used.

In order to obtain the multilayer structure, we proceeded in the same manner as that described in preceding examples relating to silica-titania multilayers, with a rotation speed fixed at 100 rps. Firstly, a multilayer formed by six laminae of $SiO_2$—$TiO_2$ was grown; next, a silica layer of greater thickness, which is obtained by repeating the deposition process of this material up to five times, was grown on the last layer of $TiO_2$. Finally, a new multilayer was grown on the defect, now titanium oxide-silica, having the same dispersions until achieving a new 6-layer structure. In this manner a silica defect was achieved within the multilayer structure, as can be observed in FIG. 6. The reflectance spectrum measured for the multilayer structure formed by stacking six $SiO_2$—$TiO_2$ laminae is shown in detail in FIG. 6a, in addition to different thicknesses in the silica defect within the multilayer achieved by repeating the deposition process of the same suspension three and five times. On increasing the thickness of the defect by volume of silica, an increase in the defect states within the photonic gap can be observed. Likewise, FIG. 6b shows scanning electron microscopy images of the cross-section of the multilayer and the defect by volume of silica within the photonic crystal, obtained by repeating the deposition process with the suspension of silica at 3% by weight five times.

Example 6

Modification of the Optical Response of the Nanoparticulate Multilayer Structure with the Properties of a Photonic Crystal on being Infiltrated with Solvents of Different Refractive Indices In this example, it was demonstrated that it is possible to modify the reflectance spectrum of the multilayer structures formed by colloidal silica and titanium oxide nanoparticles, after infiltrating solvents with different refractive indices within the structure. Specifically, in this case a displacement towards greater wavelengths and a decrease in the intensity of the reflection peak were observed, which became more pronounced the greater the refractive index of the solvent used.

The different solvent infiltration tests were carried out after stabilizing the nanoparticulate multilayer structure by heating at 450° C. for 5 hours.

A study of the modification in optical response was carried out both for multilayer structures obtained from a deposition of eight laminae alternating silica and titanium oxide, as described in Example 1, and for multilayer structures with a defect by volume of silica, obtained in the manner described in Example 5, thereby demonstrating the presence of interconnected porosity accessible from the exterior in the nanoparticulate multilayer structures.

In the case of the multilayer structure formed by eight alternating silica and titanium oxide laminae, which was obtained from colloidal suspensions of $SiO_2$ and $TiO_2$ nanoparticles at 5% by weight is a dispersing medium that is a mixture of methanol (79% by volume) and water (the remaining volume). The rotation speed of the substrate on which the layers are deposited is 100 rps. The infiltration tests with solvents were carried out adding a few drops thereof using a Pasteur pipette on the surface of the unidimensional crystal. The solvents used were water, ethylene glycol and chlorobenzene. On observing this process under an optical microscope, the existence of infiltration of the multilayer was verified, which was confirmed on analyzing the variation in its optical response. The reflectance measure obtained for each infiltrated solvent is shown in FIG. 7a. FIG. 7b represents the variation in the position of the maximum of reflectance in energy values (eV) reached in accordance with the refractive index of the solvent ($n_i$).

FIGS. 7c and 7d show the results of a similar experiment carried out using a unidimensional crystal with a defect by volume of nanoparticulate silica. As described in Example 5, firstly a multilayer structure of six laminae is formed alternating the deposition of silica nanoparticles suspended at 3% by weight and of titanium oxide nanoparticles at 5% by weight. The suspension medium is a mixture of methanol (79% by volume) and water (the remaining volume). The rotation speed of the substrate whereon the layers are deposited was 100 rps. Next, on the last layer of $TiO_2$ deposited a silica lamina of greater thickness was grown, which was achieved by repeating the deposition process of this material three times. Finally, a new multilayer structure of six laminae of titanium oxide-silica was grown, using the same suspensions. In this case, the infiltration of different solvents gives rise to a displacement of the minimum of reflection associated to the state of the optical defect, which is the function of the refractive index of the solvent used.

Materials and Methods

Preparation of the Substrates

The substrates used on this occasion are optical microscope glass slides, which were cut in squares 2.5 cm×2.5 cm in size, washed with distilled water, acetone and ultrasonicated for 30 minutes in carbon tetrachloride. Next they were washed with isopropanol, distilled water and ultrasonicated once again in a mixture of sulphuric acid and hydrogen peroxide in a volumetric proportion of 4:1 for 1 hour. Finally, they were washed with distilled water several times. After all this treatment, the substrates used were thoroughly cleaned with ethanol and dried using a nitrogen gas current.

Nanoparticle Synthesis

Colloidal titanium oxide nanoparticles are synthesized using a sol-gel technique followed by a peptisation process in a basic medium and under hydrothermal conditions. The titanium precursor used is titanium (IV) tetraisopropoxide (97%, Aldrich). Given the high reactivity of these alkoxide precursors to water, manipulation thereof is carried out in an inert atmosphere. Once the amount of necessary precursor is obtained under these conditions and is duly sealed, the rest of the experimental process is carried out in an uncontrolled atmosphere. In this manner, 20 mL of titanium tetraisopropoxide (0.0652 moles) are poured onto 36 mL of Milli-Q water (2.02 moles) and subjected to magnetic agitation in a beaker placed on an agitation plate. Agitation is maintained for 1 hour, and the resulting suspension is then filtered using 1.2 μm RTTP Millipore filters. The solid collected in the filtration process is washed three times with 10 mL portions of distilled water. The solid obtained after the washing process is collected and added to a Teflon beaker for hydrothermal synthesis where tetramethylammonium hydroxide is added (~2.8 M, Fluka), more specifically 3.9 mL of 0.6 M tetramethylammonium (0.0024 moles). The mixture is thoroughly homogenized by slightly agitating with a glass stirring rod and then subjected to hydrothermal synthesis in a heater at 120° C. for 3 hours. After that time a translucent, colloidal whitish-blue suspension of titanium oxide is obtained, in anatase crystalline phase, which is centrifuged at 14,000 rpm for 10 minutes to eliminate the possible fraction of aggregates present in the sample. This process is repeated as many times as required until the absence of aggregates is verified. The concentration by weight of oxide in the suspension is calculated by drying in a heater at 60-100° C. for 2-3 hours, which in this case is approximately 24-25% by weight.

$TiO_2$ nanoparticle synthesis with different size distribution with respect to the previous (and, therefore, different porosity and different refractive index) is achieved using the same sol-gel technique, followed by a peptisation process in a basic medium and under hydrothermal conditions, to which particle growth is added also under hydrothermal conditions at a higher temperature, more specifically at 190° C. for 4.5 hours. The experimental process is identical to that previously described, using the same reactives and with the same concentrations. The whitish suspension of titanium oxide obtained (anatase) is centrifuged at 3,000 rpm for 10 minutes to eliminate the aggregated fraction. The concentration by weight of oxide, calculated by drying in a heater between 60-100° C. for 2-3 hours, is comprised between 14-17% by weight.

The colloidal tin oxide particles are obtained by means of a forced hydrolysis method at high temperatures. The aquocomplexes formed in solution are hydrolyzed and condensed over time, a very slow reaction at ambient temperature which can be accelerated with an increase thereof. The nature of the precipitate particles obtained will depend on factors such as reactive concentration, pH, aging time, temperature and nature of the ions present in the solution. The tin precursor used is pentahydrated tin (IV) chloride (98%, Riedel-de Haën) dissolved in acid solution, specifically in HCl (37%, Fluka). 0.5 L of tin salt solution is prepared in 0.3 M diluted HCl. The final tin concentration in the solution is 0.003 M. for which 537 mg (0.0015 moles) of the compound much be dissolved. The prepared dissolution is decanted into a glass recipient sealed by a plug for subsequent aging thereof in a heater at 100° C. for 2 hours. After this time the resulting suspension is cooled in a water bath and centrifuged at 8,000 rpm for 10 minutes, eliminating the supernatant solution. The solid obtained is redispersed in distilled water using an ultrasound bath. This process is repeated three times. After the last centrifugation, the particles are redispersed in a volume of approximately 2 mL of distilled water. The concentration by weight of oxide in the suspension is calculated by drying in a heater between 60-100° C. for 2-3 hours, which is comprised between 4-5% by weight.

The necessary dispersions for the deposition process by spin-coating were obtained by dilution of the nanoparticles thus obtained with different solvents.

Preparation of the Colloidal Suspensions

The materials used in the form of nanoparticles for obtaining the multilayer structure with the properties of a photonic crystal are those which allow a refractive index contrast between the layers to be obtained. As previously described, three types of colloidal particles: titanium, silicon and tin oxide, have been used herein.

The precursor suspensions, used to obtain laminae of controlled thickness with different refractive indices, are achieved by dilution with different solvents based on the suspensions obtained after the synthesis process, as detailed in preceding sections. The suspensions of titanium oxide and tin oxide nanoparticles are obtained, more specifically, by dilution with distilled water and/or methanol (Multisolvent HPLC grade) in different proportions. The final concentration of oxide used in both cases during the spin-coating process is comprised between 1-10% by weight. The colloidal amorphous silica particles are commercial (LUDOX TMA colloidal silica, Aldrich), suspension at 34% by water. These dispersions are also diluted with the previously indicated solvent mixture until reaching concentrations comprised between 1-6% by weight of silica.

Preparation of the Multilayer Structure Based on the Colloidal Suspensions

The unidimensional photonic crystal is obtained by repeating the deposition process of laminae of nanoparticles, alternating materials with different refractive indices. Important factors for controlling laminae thickness and, therefore, the reflectance spectrum obtained in each case are, among others, the concentration of the suspension used and the rotation speed in the spin-coating process. In this manner, multilayer structures with the properties of a Bragg reflector in a wide wavelength range can be prepared.

In order to obtain the multilayer structure, the previously treated glass substrates, cleaned with ethanol and dried using a nitrogen gas current, were used. These substrates were placed on the spin coater sample holder (Novocontrol GMBH), which operates at atmospheric pressure, proceeding in the following manner: a volume of 250 μl of the precursor dispersions prepared with the solvent mixture is suspended, the whole surface of the substrate is well covered and a rotation speed comprised between 80-130 rps is applied for 1 minute.

Preparation of the $SiO_2$—$TiO_2$ multilayer structure starts by depositing the silica on the substrate, using the suspensions of concentrations comprised between 1% and 6% by weight of $SiO_2$ with a solvent mixture (21% by volume of water and 79% by volume of methanol). The volume of suspension is dispensed and a rotation speed comprised between 80-130 rps is applied for 1 minute. Subsequently, we proceed in a similar manner with the suspension of titanium oxide, with a concentration by weight of 5% prepared by dilution with methanol of that obtained in the hydrothermal synthesis at 120° C. By alternating the suspensions of silica and titanium oxide the desired multilayer structure is obtained, achieving greater reflectances on increasing the number of deposited layers. The use of different concentrations in the silica dispersions and/or the deposition of the laminae at different rotation speeds allowed reflectance spectra in a wide wavelength range to be obtained.

In the case of the multilayers formed by $TiO_2$—$SiO_2$, the indicated dispersion volumes are suspended, with a concentration of 5% by weight of titanium oxide by dilution with methanol subsequent to synthesis at 120° C. and 4.5% by weight of tin oxide in distilled water.

In the case of the multilayer structure prepared with titanium oxide, we proceed in a similar manner to that described previously for $SiO_2$—$TiO_2$. The necessary volumes of $TiO_2$ are dispensed on the substrate, obtained from hydrothermal synthesis at 120° C. and 190° C., having concentrations of 8.5% by weight by dilution with water. By alternating the suspensions of titanium oxide with different size distribution, we achieve refractive index contrast and, therefore, a unidimensional photonic crystal.

Characterization of the Multilayer Structure Obtained (FESEM, Specular Optical Reflectance)

The multilayers obtained through the previously described process were structurally characterized using scanning electron microscopy (SEM) and optically characterized using spectroscopy in reflection mode in the visible and infrared range close to the EM spectrum, wherein most of the photonic crystal properties thereof are observed. The reflectance spectra were measured using FTIR Bruker equipment attached to a microscope wherein a 4× objective lens with a numerical aperture of 0.1 (light cone angle ±5.7°) was used. SEM images of different cross-sections of the samples were taken using a Hitachi field-emission microscope.

Having sufficiently described the nature of the various example embodiments, it should be stated that the aforementioned devices and those represented in the drawings may have their details modified provided it does not alter the fundamental principle.

The invention is, of course, not limited to the examples described but cover all the variants defined in the claims. The terms "a" and "an" and "the" and similar referents used in the context of the following claims are to be construed to cover both the singular and the plural, unless otherwise indicated herein or clearly contradicted by context. All methods described herein can be performed in any suitable order unless otherwise indicated herein or otherwise clearly contradicted by context. The use of any and all examples, or exemplary language (e.g. "such as") provided herein is intended merely to better illuminate the embodiments and does not pose a limitation on the scope of the embodiments otherwise claimed. No language in the specification should be construed as indicating any non-claimed element essential to the practice of the embodiments.

The use of the term "or" in the claims is used to mean "and/or" unless explicitly indicated to refer to alternatives only or the alternatives are mutually exclusive, although the disclosure supports a definition that refers to only alternatives and "and/or." Groupings of alternative elements or embodiments disclosed herein are not to be construed as limitations. Each group member may be referred to and claimed individually or in any combination with other members of the group or other elements found herein. It is anticipated that one or more members of a group may be included in, or deleted from, a group for reasons of convenience and/or patentability. When any such inclusion or deletion occurs, the specification is herein deemed to contain the group as modified thus fulfilling the written description of all Markush groups used in the appended claims.

Preferred embodiments are described herein, including the best mode known to the inventors for carrying out the invention. Of course, variations on those preferred embodiments will become apparent to those of ordinary skill in the art upon reading the foregoing description. The inventors expect those of ordinary skill in the art to employ such variations as appropriate, and the inventors intend for the embodiments to be practiced otherwise than specifically described herein. Accordingly, these embodiments include all modifications and equivalents of the subject matter recited in the claims appended hereto as permitted by applicable law. Moreover, any combination of the above-described elements in all possible variations thereof are encompassed by the embodiments unless otherwise indicated herein or otherwise clearly contradicted by context.

Further, it is to be understood that the example embodiments disclosed herein are illustrative. Other modifications that may be employed are within the scope of the embodiments. Thus, by way of example, but not of limitation, alternative configurations of the present embodiments may be utilized in accordance with the teachings herein. Accordingly, the present embodiments are not limited to that precisely as shown and described in the specification and drawings.

The invention claimed is:

1. A mesoporous nanoparticulate multilayer structure, with the properties of a Bragg reflector or unidimensional photonic crystal, comprising periodically alternating mesoporous laminae wherein said mesoporous laminae are formed by a deposition of previously synthesized nanoparticles, said mesoporous laminae comprising contacting nanoparticles of different refractive indices forming an externally accessible and interconnected, but randomly distributed pore structure, and wherein said mesoporous laminae are of a thickness between about 1 nm and about 200 nm and wherein the nanoparticles have a size between about 1 nm and about 100 nm and provide a desired refractive index contrast between the mesoporous laminae to be obtained, and the nanoparticles include a metal oxide combined with a metal halide, a nitride, a carbide, a chalcogenide, a metal, a semiconductor, a polymer, or a combination thereof.

2. The nanoparticulate multilayer structure of claim 1, wherein said nanoparticles comprise a plurality of materials.

3. The nanoparticulate multilayer structure of claim 1, wherein said nanoparticles are of the same material.

4. The nanoparticulate multilayer structure of claim 1, wherein said metal oxide is an inorganic oxide in its amorphous or crystalline phase.

5. The nanoparticulate multilayer structure of claim 1, wherein said nanoparticles include at least one of $SiO_2$, $TiO_2$, $SnO_2$, $ZnO$, $Nb_2O_5$, $CeO_2$, $Fe_2O_3$, $Fe_3O_4$, $V_2O_5$, $Cr_2O_3$, $HfO_2$, $MnO_2$, $Mn_2O_3$, $Co_3O_4$, $NiO$, $Al_2O_3$, $In_2O_3$, $SnO_2$, CdS, CdSe, ZnS, ZnSe, Ag, Au, Ni, Co, Se, Si, Ge, and combinations thereof.

6. The nanoparticulate multilayer structure of claim 1, wherein said nanoparticles include at least one of $SiO_2/TiO_2$ and $SiO_2/SnO_2$.

7. The nanoparticulate multilayer structure of claim 1, wherein the laminae include pores having a diameter between about 1 nm and about 100 nm.

8. The nanoparticulate multilayer structure of claim 1 comprising nanoparticles of different particle size distribution.

9. The nanoparticulate multilayer structure of claim 8, wherein said mesoporous laminae comprise nanoparticles of $TiO_2$ having a different particle size distribution.

10. The nanoparticulate multilayer structure of claim 1, wherein said structure comprises at least one rupture in the periodicity of the mesoporous laminae.

11. The nanoparticulate multilayer structure of claim 10, wherein the at least one rupture in periodicity is due to the presence of a lamina of different depth or thickness with respect to those lamina which determine periodicity.

12. The nanoparticulate multilayer structure of claim 11, wherein the at least one rupture in periodicity is accompanied by the use of nanoparticles of different material.

13. A process for obtaining the nanoparticulate multilayer structure of claim 1, said process comprising:
  a) preparing a suspension of nanoparticles comprising a material that can be obtained in the form of a nanoparticle, wherein the suspension medium is a liquid wherein these particles can be dispersed, and wherein the concentration thereof is between 1% and 99%; and
  b) forming a multilayer structure of a high interconnected porosity and with the properties of a unidimensional photonic crystal through the alternating deposition, on a substrate, of laminae of controlled thickness of nanoparticles of the prepared suspension, in such a manner as to create an alternation in refractive index value, and wherein the thickness of each of the laminae of nanoparticles that forms the multilayer structure is between about 1 nm and about 1 micron, and wherein the number of nanoparticulate laminae present in the multilayer structure varies between 1 and 100 layers.

14. The process of claim 13, wherein said deposition step comprises at least one of spin-coating, dip-coating, and Langmuir-Blodgett.

15. The process of claim 13, wherein the prepared suspension comprises nanoparticles having a size between about 1 nm and about 100 nm and which allow the desired refractive index contrast between the laminae to be obtained.

16. The process according of claim 15, wherein the nanoparticles of the prepared suspension may be of the same or different material and, at the same time, each lamina in the multilayer structure of which the nanoparticles form a part may have a different porosity due to the use of the same or different nanoparticle size, such that it gives rise to a different refractive index in each lamina.

17. The process of claim 15, wherein the deposition of the laminae is carried out using a method that allows a lamina of uniform thickness between about 2 nm and about 1 micron to be obtained.

18. The process of claim 15, wherein the deposition of the laminae is carried out maintaining a periodicity throughout the structure or creating a rupture in said characteristic or defect.

19. The process of claim 18, wherein the rupture in the periodicity or defect of the structure is created by the presence of a lamina of different thickness to that of the rest of the laminae.

20. A method, comprising:
  manufacturing an optical element using the nanoparticulate multilayer structure of claim 1.

21. The method of claim 20, wherein the optical element is a sensor device for compounds in liquid and gaseous phase or dispersed in the form of nanoparticles, making use of the high interconnected porosity of the nanoparticulate multilayer structure and of the dependence of its color on the refractive index of the infiltrated compound.

22. The method of claim 20, wherein the optical element is a reflective coating of a predetermined wavelength range in photovoltaic and photocatalytic devices, wherein the implementation of high-reflectance and, at the same time, porous mirrors serves to increase their efficiency.

23. The method of claim 20, wherein the optical element is a colored coating of ornamental or technological application.

24. The method of claim 23, wherein the nanoparticular structure forms a reflective coating for a predetermined wavelength range.

* * * * *